United States Patent
Masuda et al.

(10) Patent No.: US 7,631,718 B2
(45) Date of Patent: Dec. 15, 2009

(54) SADDLE-TYPE VEHICLE AND ENGINE

(75) Inventors: Tatsuya Masuda, Iwata (JP); Yousuke Ishida, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 418 days.

(21) Appl. No.: 11/333,766

(22) Filed: Jan. 17, 2006

(65) Prior Publication Data
US 2006/0199687 A1 Sep. 7, 2006

Related U.S. Application Data

(63) Continuation of application No. PCT/JP2004/00882, filed on Jun. 24, 2004.

(30) Foreign Application Priority Data
Jul. 16, 2003 (JP) .............................. 2003-275168

(51) Int. Cl.
B60K 17/04 (2006.01)
(52) U.S. Cl. ...................................... 180/230; 180/227
(58) Field of Classification Search ................ 180/219, 180/230, 226, 227, 231, 292, 297, 374; 474/12
See application file for complete search history.

(56) References Cited

U.S. PATENT DOCUMENTS

| | | | |
|---|---|---|---|
| 4,344,500 A | | 8/1982 | Kurata et al. |
| 4,345,664 A | | 8/1982 | Anno et al. |
| 4,497,285 A | | 2/1985 | Kondo |
| 4,723,619 A | * | 2/1988 | Yamamoto et al. .......... 180/219 |
| 5,152,361 A | * | 10/1992 | Hasegawa et al. .......... 180/230 |
| 6,155,371 A | * | 12/2000 | Izumi ......................... 180/292 |
| 6,238,312 B1 | * | 5/2001 | Tsubata et al. .............. 474/144 |
| 6,269,899 B1 | | 8/2001 | Izumi |
| 6,497,211 B2 | | 12/2002 | Nomura et al. |
| 2002/0005191 A1 | * | 1/2002 | Maeda et al. ............... 123/572 |

FOREIGN PATENT DOCUMENTS

| | | |
|---|---|---|
| JP | 52-56104 | 4/1977 |
| JP | 54-49429 | 4/1979 |
| JP | 1-111598 | 4/1989 |
| JP | 02-231293 | 9/1990 |
| JP | 03-176289 | 7/1991 |
| JP | 05-213262 | 8/1993 |
| JP | 05-229470 | 9/1993 |
| JP | 06-048363 | 2/1994 |
| JP | 11-49064 | 2/1999 |
| JP | 11-123941 | 5/1999 |

(Continued)

Primary Examiner—Anne Marie M Boehler
(74) Attorney, Agent, or Firm—Knobbe, Martens, Olson & Bear, LLP

(57) ABSTRACT

A secondary sheave shaft of a transmission is disposed vertically higher than a drive shaft when viewed along the axial direction of the shafts. An idle shaft of a speed-reduction mechanism is disposed between a primary sheave and an imaginary plane that extends through an axis of rotation of the secondary sheave shaft and an axis of rotation of the drive shaft. The drive shaft is disposed inside a profile of a transmission case when viewed along the axial direction of the secondary sheave shaft and the drive shaft.

17 Claims, 4 Drawing Sheets

FOREIGN PATENT DOCUMENTS

| | | |
|---|---|---|
| JP | 11-166467 | 6/1999 |
| JP | 2000-34967 | 2/2000 |
| JP | 2000-205091 | 7/2000 |
| JP | A 2001-3723 | 2/2001 |
| JP | A 2001-65650 | 3/2001 |
| JP | 2001-277874 | 10/2001 |
| JP | 2002-19681 | 1/2002 |
| JP | A 2002-19682 | 1/2002 |

* cited by examiner

SADDLE-TYPE VEHICLE AND ENGINE

CROSS-REFERENCE TO RELATED APPLICATIONS

This application is a continuation of PCT Application No. PCT/JP2004/008882, filed on Jun. 24, 2004, which claimed the priority of Japanese Patent Application No. 2003-275168, filed Jul. 16, 2003, each of which is hereby incorporated by reference in its entirety.

BACKGROUND OF THE INVENTION

1. Field of the Invention

The present invention generally relates to engines used with saddle-type vehicles.

2. Description of the Related Art

Saddle-type vehicles can have a number of different configurations, such as motorcycles, scooters, four-wheeled vehicles and the like. The engines of such saddle-type vehicles often include integrated auxiliary components, such as a continuously variable transmission and a speed reduction mechanism. Together with these auxiliary components, the engines are mounted to the body or frame of the vehicle.

JP-A-2001-3723 (hereinafter, referred to as Patent Document 1) discloses an engine including a V-belt continuously variable transmission, a centrifugal clutch, and a speed-reduction mechanism. In this engine, a driving pulley (hereinafter, referred to as a primary sheave) of the V-belt transmission is mounted to the crankshaft of the engine. A driven pulley (hereinafter, referred to as a secondary sheave) of the V-belt transmission connects to a drive shaft through a centrifugal clutch and an idle shaft of the speed-reduction mechanism. Of course, the engine includes various rotating shafts therein. The shafts are arranged in a transverse orientation such that the arrangement of the shafts can best be described by a side view of the engine. In the engine disclosed in Patent Document 1, as shown in FIG. 5, a secondary sheave shaft that carries the secondary sheave is arranged vertically lower than a drive shaft.

As shown in FIG. 6 of JP-A-2001-65650 (hereinafter, referred to as Patent Document 2), Patent Document 2 discloses an engine having a secondary sheave shaft arranged vertically higher than a drive shaft associated with the engine. The engine has a speed-reduction mechanism between the secondary sheave shaft and the drive shaft.

As shown in FIG. 2 of JP-A-2002-19682 (hereinafter, referred to as Patent Document 3), Patent Document 3 discloses an engine having a secondary sheave shaft and a drive shaft that are generally at the same vertical height. In other words, the secondary sheave shaft and the drive shaft of the engine are arranged substantially on the same vertical level. Also the engine includes a speed-reduction mechanism that is positioned between the secondary sheave shaft and the drive shaft.

SUMMARY OF THE INVENTION

As described above, transmissions can have secondary sheave shafts and drive shafts that are positioned in any of a number of configurations; however, when a speed-reduction mechanism featuring an idle shaft is used with the transmission, the transmission size normally is relatively large due to the need to accommodate the many rotating shafts used in the transmission. A transmission arrangement is desired, therefore, in which the shafts are positioned such that the transmission size can be decreased.

One aspect of the present invention involves a saddle-type vehicle engine unit. The engine unit comprises an engine body. The engine body comprises a transversely-extending crankshaft. A transmission comprises a primary sheave, a secondary sheave and a flexible member connecting the primary sheave and the secondary sheave. The primary sheave is connected to the crankshaft such that the crankshaft and the primary sheave rotate together. The secondary sheave is connected to a transversely-extending secondary sheave shaft such that the secondary sheave and the secondary sheave shaft rotate together. A transmission case generally encloses the primary sheave, the secondary sheave, and the flexible member. A transversely-extending idle shaft is connected to the secondary sheave shaft such that rotation of the secondary sheave shaft causes rotation of the idle shaft. The idle shaft forms a portion of a speed-reduction mechanism. A transversely-extending drive shaft is connected to the speed-reduction mechanism. The secondary sheave shaft is positioned vertically higher than at least a portion of the drive shaft. An imaginary plane extends through a rotational axis of the secondary sheave shaft and the drive shaft. The idle shaft is disposed between the primary sheave and the imaginary plane. The drive shaft is positioned inside an outer profile of the transmission case when viewed from a lateral side of the engine unit.

BRIEF DESCRIPTION OF THE DRAWINGS

These and other features, aspects and advantages of the present invention will be described with reference to drawings of a preferred embodiment, which embodiment is intended to illustrate, and is not intended to limit the scope of, the present invention. The drawings comprise four figures.

DETAILED DESCRIPTION OF THE PREFERRED EMBODIMENT

Figure 1:
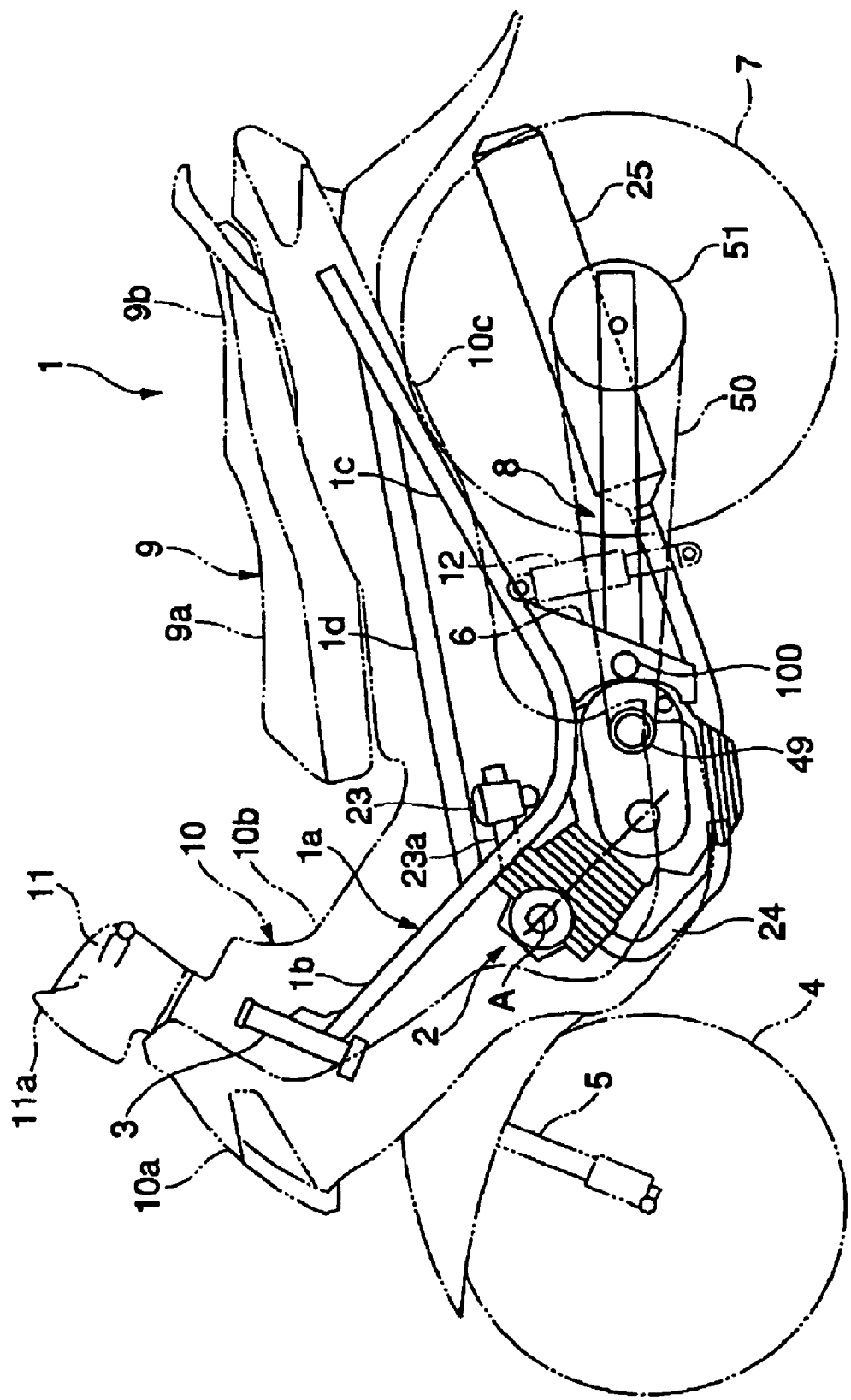
FIG. 1 is a left side view of a saddle-type vehicle and an engine unit that are arranged and configured in accordance with certain features, aspects and advantages of the present invention.

FIG. 1 shows a saddle-type vehicle 1 that comprises an engine unit 2 that is arranged and configured in accordance with certain features, aspects and advantages of the present invention. The illustrated engine unit 2 preferably comprises an engine with an integrated continuously variable transmission. The illustrated engine unit 2 comprises an air-cooled, four-cycle single-cylinder engine. Other vehicles and engine units also may benefit from certain features, aspects and advantages of the present invention. In addition, other types of engines and motors also can be used.

With reference to FIG. 1, a head pipe 3 is fixed to a forward portion of a body frame 1a. The head pipe 3 supports a front fork 5, which can be turned laterally to effect steering of the vehicle 1. The front fork 5 preferably supports a front wheel 4 at the lower end.

A rear-arm bracket 6 is disposed in the center of the length of the illustrated vehicle body. The rear-arm bracket 6 supports a rear arm 8 via a pivot shaft 100. The pivot shaft 100 defines a supporting point or pivot axis. The rear arm 8 is pivotally supported by the pivot shaft 100. The rear arm 8 therefore can rotate or pivot about the pivot shaft 100. A rear portion of the rear arm 8 supports a rear wheel 7.

A seat 9 is mounted to the body frame 1a. The seat 9 preferably includes a driver seat 9a and a rear-passenger seat 9b. The driver seat 9a and the rear-passenger seat 9b preferably are arranged in tandem and can be integrally formed. The engine unit 2 preferably is mounted to the body frame 1a such that a drive shaft 48 (refer to FIG. 4) of the engine unit 2 is positioned rearward of a crankshaft 28 of the engine unit 2. In the illustrated engine unit 2, the pivot shaft 100 of the rear arm 8 is positioned rearward of the engine unit 2 at a location that is generally rearward of the drive shaft 48. See FIG. 4.

With reference again to FIG. 1, the illustrated body frame 1a comprises a down tube 1b that extends obliquely downward in a rearward direction from the head pipe 3. An upper tube 1c extends obliquely upward from a rear portion of the down tube 1b. A seat rail 1d joins the down tube 1b and the upper tube 1c and extends generally longitudinally between the down tube 1b and the upper tube 1c. In one preferred configuration, the down tube 1b, the upper tube 1c, and the seat rail 1d are provided on each of the opposing sides of the vehicle body (i.e., the left side and the right side).

Preferably, the body frame 1a is covered with a cover 10. The cover can be formed of any suitable material. In one configuration, the cover 10 is formed of a resin-based material. The cover 10 preferably comprises a front cover 10a, a leg shield 10b, a side cover 10c and the like. A steering handle 11 covered with a handle cover 11a can be secured to the upper end of the front fork 5. A rear cushion 12 (i.e., a shock absorber) can be positioned between the rear arm 8 and the rear-arm bracket 6.

Figure 2:
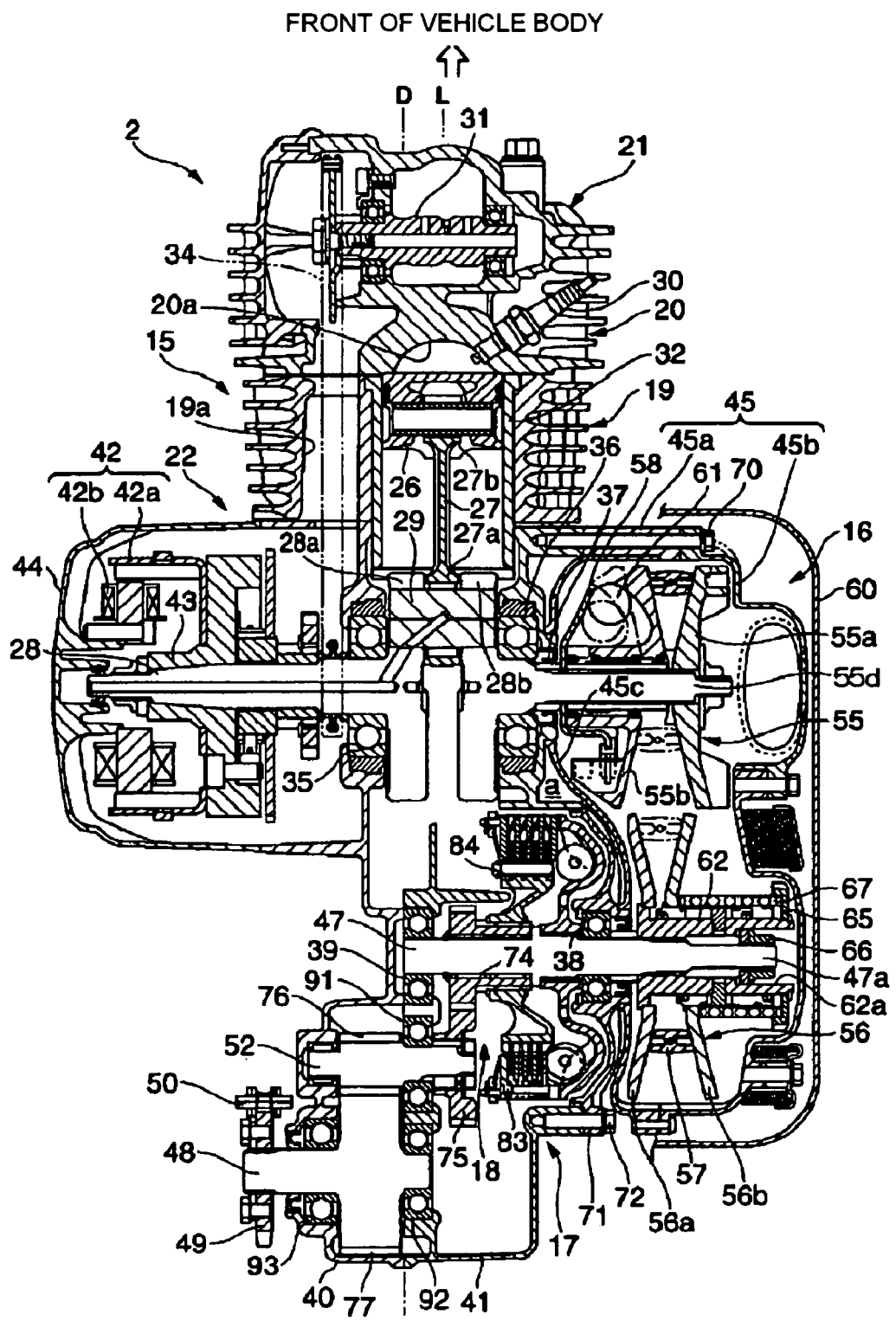
FIG. 2 is a cross-sectional view of the engine unit of FIG. 1 taken along the line II-II in FIG. 4.

The engine unit 2 preferably hangs from the down tube 1b of the body frame 1a. With reference to FIG. 2, the illustrated engine unit 2 preferably comprises an engine body 15. A cylinder axis A of the engine body 15 preferably inclines approximately 45 degrees relative to an imaginary generally horizontal plane that extends through the engine unit 2.

Figure 3:
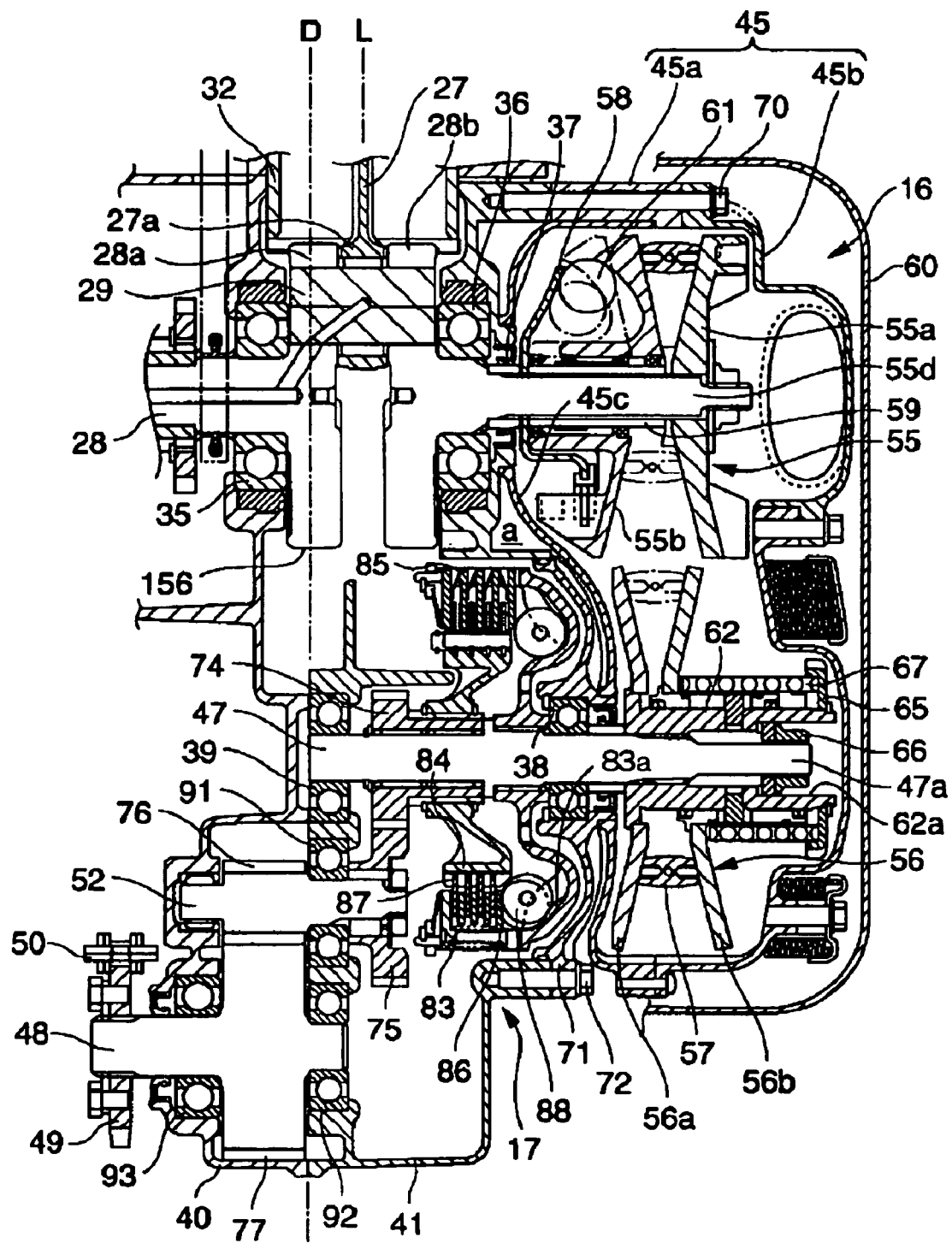
FIG. 3 is a partial cross-sectional view of the engine unit of FIG. 1.
Figure 4:
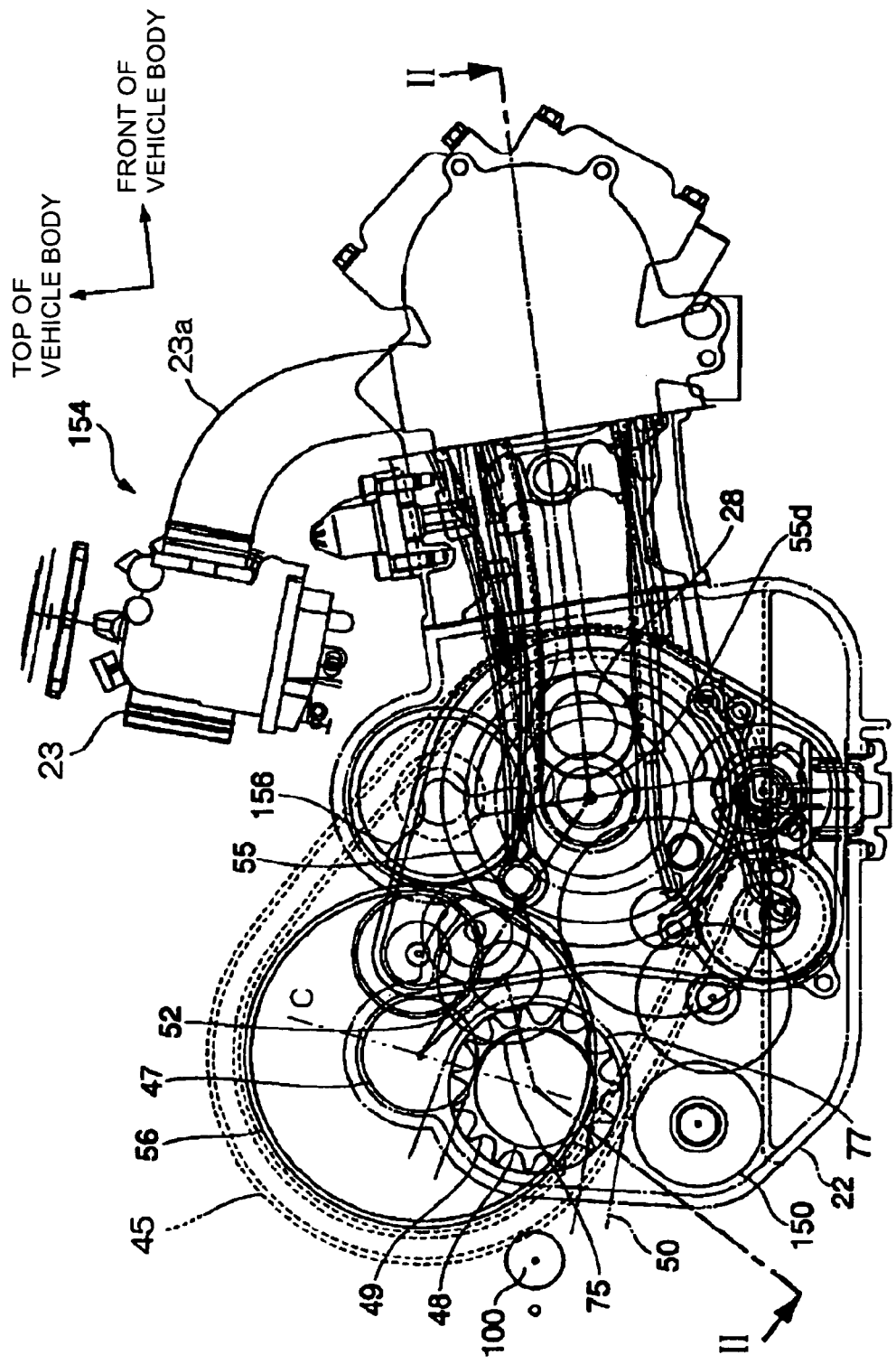
FIG. 4 is a right side view of the arrangement of rotating shafts of the engine unit of FIG. 1.

With reference now to FIGS. 2 through 4, the engine unit 2 also comprises a continuously variable transmission 16, a centrifugal clutch 17 and a speed-reduction mechanism 18. The continuously variable transmission 16 preferably comprises a belt-type continuously variable transmission. In one configuration, the continuously variable transmission 16 comprises a V-belt type continuously variable transmission.

The engine body 15 preferably comprises a cylinder block 19, a cylinder head 20 and a crank case 22. The cylinder head 20 can be joined with an upper joint surface of the cylinder block 19. A head cover 21 can be provided on the cylinder head 20. The crank case 22 can be joined with a lower joint surface of the cylinder block 19. The crank case 22 preferably supports the crankshaft 28 and a secondary sheave shaft 47 (i.e., a transmission shaft).

An intake port (not shown) communicates with a combustion recess 20a. The intake port can open through a rear surface of the cylinder head 20. With reference to FIG. 1, an intake pipe 23a preferably connects the intake port to a carburetor 23. An exhaust port (not shown) also communicates with the combustion recess 20a. The exhaust port can open through a front surface of the cylinder head 20. The exhaust port preferably connects to an exhaust pipe 24. As shown in FIG. 1, the exhaust pipe 24 can extend obliquely downward in a rearward direction such that it passes along a right side of the engine body 15 before extending obliquely upward in a rearward direction. The exhaust pipe 24 preferably connects to a muffler 25. The muffler 25 can be positioned to the right side of the rear wheel 7. With reference to FIG. 2, a spark plug 30 can be disposed in the combustion recess 20a.

A chain chamber 19a connecting the interior of the crank case 22 and the interior of the cylinder head 20 can be provided along the left of the cylinder block 19. The chain chamber 19a preferably houses a timing chain 34. The timing chain 34 can be wound around the crankshaft 28 and a cam shaft 31. Thus, the cam shaft 31 rotates with the crankshaft 28 and the cam shaft 31 opens and closes intake valves and/or exhaust valves. Other valve actuating mechanisms also can be used (e.g., push rods, solenoids, etc.).

A piston 26 is slidably disposed in a cylinder bore defined in the cylinder block 19. In the illustrated configuration, the cylinder bore is defined by a cylinder sleeve 32 that is mounted in the cylinder block 19. The piston 26 connects to a small end 27b of a connecting rod 27. A crankpin 29 is provided between a left crank arm 28a and a right crank arm 28b of the crankshaft 28. A large end 27a of the connecting rod 27 connects to the crankpin 29.

In the illustrated configuration, the crank case 22 comprises at least two portions. Preferably, the crank case 22 is divided into two cases, namely, a first case 40 and a second case 41. The first case is on the left side and the second case is on the right side. The joint surface between the first case 40 and the second case 41 (i.e., the dividing surface D of the crank case 22) preferably extends generally parallel to the axis line L of the cylinder block 19. The dividing surface D preferably does not align with the axis line L but is offset to one side of the axis line L. In the illustrated configuration, the dividing surface D is offset to the left of the axis line L.

A case cover 71 is mounted to the right side of the second case 41 in the illustrated configuration. Preferably, the second case 41 has an opening along its right side, which opening is covered with the case cover 71. The case cover 71 can be removably secured to the second case 41 with a bolt 72 or with any other suitable technique (e.g., interlocking mechanical components, slots, tabs or the like). The case cover 71 preferably is easily installed and removed. The centrifugal clutch 17 and the secondary sheave shaft 47 can be easily removed from the engine unit 2 once the case cover 71 is removed from the second case 41.

A generator case 44 can be removably secured to a forward portion of the left side of the first case 40. Other positions also are possible. The generator case 44 at least partially defines a cavity in which a generator 42 can be positioned. With continued reference to FIG. 2, a transmission case 45 for accommodating the continuously variable transmission 16 preferably is mounted to the right side of the second case 41. The continuously variable transmission 16 can be positioned within a transmission chamber that is at least partially defined by the transmission case 45.

Advantageously, the transmission case 45 is separated from the crank case 22 and comprises a case body 45a and a cover 45b. The case body 45a can be positioned to the right of the second case 41 and can open to the right. The cover 45b can be positioned to the right of the case body 45a and can be positioned such that it generally closes the opening formed to the right of the case body 45a. In one preferred configuration, the case body 45a, the cover 45b, and the second case 41 can be secured together with a single bolt 70. Other configurations also can be used. A clearance "a" can be provided between the bottom wall 45c of the case body 45a and the second case 41. Because the case body 45a and the second case 41 are spaced apart in this manner (e.g., a void is formed between the case body 45a and the second case 41), the likelihood of heat from the engine body 15 being transmitted to the transmission case 45 is greatly reduced. In one preferred configuration, the right side of the transmission case 45 can be covered with a further cover 60 that provides a pleasing aesthetic appearance.

The crankshaft 28 extends generally horizontally in a forward portion (i.e., in the upper portion of FIG. 2) of the crank case 22. While not shown, a balancer shaft can be driven by the crankshaft 28, which balancer shaft can comprise a balancer weight 156 (see FIG. 4). The portion of the illustrated crankshaft 28 positioned to the left of an imaginary longitudinal plane that intersects the axis line L is supported by the first case 40 via a bearing 35. The portion of the illustrated crankshaft 28 positioned to the right of the imaginary longitudinal plane that intersects the axis line L is rotatably supported by the second case 41 via a bearing 36. Other support configurations also can be used.

The left portion of the illustrated crankshaft 28 extends beyond the first case 40 into the interior of the generator case 44. The left end of the crankshaft 28 carries the generator 42. The generator 42 can be connected to the crankshaft in any suitable manner. In one configuration, the generator 42 comprises an input shaft that is separate from, but driven by, the crankshaft 28. The illustrated configuration, however, is advantageously compact in structure. The generator 42 preferably comprises a stator 42*b* and a rotor 42*a* that is opposed to the stator 42*b*. The rotor 42*a* can be fixed to a sleeve 43 that rotates with the crankshaft 28. The sleeve 43 preferably receives a tapered portion of the crankshaft 28. The stator 42*b* can be fixed to the generator case 44. As the rotor 42*a* spins relative to the stator 42*b*, the generator 42 creates an electrical supply for use by the engine and other components.

The right portion of the illustrated crankshaft 28 extends beyond the second case 41 into the interior of the chamber defined at least partially by the transmission case 45. The right end of the crankshaft 28 carries a primary sheave 55 (i.e., a driving pulley) of the continuously variable transmission 16. The sheave 55 can be secured to the crankshaft 55 with a nut or in any other suitable manner. The primary sheave 55 therefore rotates with the crankshaft 28. In the illustrated configuration, the right end of the crankshaft 28 defines a primary sheave shaft 55*d*. However, the primary sheave 55 and the crankshaft 28 can be connected in any suitable manner. For example, in some configurations, the primary sheave shaft 55*d* and the crankshaft 28 may be formed separately. Moreover, the primary sheave shaft 55*d* may not necessarily be coaxial with the crankshaft 28 but may be parallel with the crankshaft 28. Accordingly, as used throughout this application, unless otherwise apparent, "connection" connotes any style of connection, direct or indirect.

A sealing member 37 can be provided between the part of the second case 41 through which the crankshaft 28 extends and the bottom wall 45*c* of the transmission case 45. The second case 41 therefore is generally sealed from the transmission case 45. Accordingly, when a clutch is accommodated in the second case 41, the clutch can be of the wet type of clutch. In a preferred configuration, the centrifugal clutch 17 comprises a multiplate wet centrifugal clutch.

The secondary sheave shaft 47, which comprises a rotational axis that is generally parallel to the crankshaft 28, can be positioned at a rearward location in the crank case 23 (i.e., in the lower portion of FIG. 2). The right portion of the secondary sheave shaft 47 can be supported by the case cover 71 with a bearing 38 while the left side can be supported by the left end of the second case 41 with a bearing 39. The right portion of the secondary sheave shaft 47 preferably extends beyond the second case 41 into the transmission case 45. In a preferred configuration, the right end of the secondary sheave shaft 47 connects to a secondary sheave 56 (i.e., driven pulley) of the continuously variable transmission 16. More preferably, the secondary sheave 56 is arranged coaxially with the secondary sheave shaft 47.

With continued reference to FIG. 2, the centrifugal clutch 17 can be mounted to the left of the secondary sheave shaft 47. Preferably, the centrifugal clutch 17 is arranged generally adjacent to the cylinder block 19. Such an arrangement can be accommodated by the large interior chamber defined by the second case 41. More particularly, in the illustrated engine unit 2, the dividing surface D of the crank case 22 is positioned to the left of the imaginary longitudinal plane that intersects the axis line L of the cylinder block 19. Such a configuration results in a rather wide lateral space in the second case 41. Thus, the centrifugal clutch 17 can be positioned to the left of the secondary sheave 56.

In the illustrated configuration, the centrifugal clutch 17 comprises a multiplate wet centrifugal clutch. Thus, the clutch 17 comprises an inner clutch 84 and a bowl-shaped outer clutch 83. Splines connect the outer clutch 83 to the secondary sheave shaft 47. Other constructions also can be used such that the outer clutch 83 rotates with the secondary sheave shaft 47 while the outer clutch 83 can still move freely along the axis of the secondary sheave shaft 47. The inner clutch 84 is positioned coaxially inside the outer clutch 83. The inner clutch 84 is in spline engagement with a primary reduction small gear 74. The reduction small gear 74 rotates with the inner clutch 84. Preferably, the reduction small gear 74 is rotatably supported by the secondary sheave shaft 47.

With reference to FIG. 3, multiple outer clutch plates 85 can be disposed in the outer clutch 83. On both sides of the outer clutch plates 85, pressure plates 86 are disposed. The outer clutch plates 85 and the pressure plates 86 are connected to the outer clutch 83 such that the outer clutch plates 85 and the pressure plates 86 will rotate with the outer clutch 83. Between the outer clutch plates 85 and the pressure plates 86, inner clutch plates 87 are disposed. The inner clutch plates 87 are connected to the outer circumference of the inner clutch 84 such that the inner clutch plates 87 will rotate with the inner clutch 84.

A moveable weight 88 is disposed between a cam surface 83*a* and the right pressure plate 86 in the illustrated embodiment. When the rotational speed of the outer clutch 83 exceeds a prescribed value, the weight 88 moves radially outward due to the centrifugal force applied to the weight. As the weight 88 moves radially outward, the weight moves along the cam surface 83*a* and works against the right pressure plate 86. Thus, the right pressure plate 86 is pushed to the left by the weight 88 and the outer clutch plates 85 and the inner clutch plates 87 become engaged. To better show this feature, in FIGS. 2 and 3, the front of the centrifugal clutch 17 (the upper part in FIGS. 2 and 3) is shown in a disengaged state while the rear (the lower part in FIGS. 2 and 3) is shown in an engaged state.

The continuously variable transmission 16 comprises the primary sheave 55, the secondary sheave 56, and a flexible transmitter 57, such as a V-belt, wound around the primary sheave 55 and the secondary sheave 56. The primary sheave 55 is mounted to the right end of the illustrated crankshaft 28, as has been described. Preferably, the primary sheave 55 and the crankshaft 28 are connected such that they rotate together. Accordingly, the crankshaft 28 drives the primary sheave 55. Preferably, the secondary sheave 56 is connected for rotation with the secondary sheave shaft 47 such that the secondary sheave 56 drives the secondary sheave shaft 47.

The primary sheave 55 comprises a fixed pulley half 55*a* and a movable pulley half 55*b*. The fixed pulley half 55*a* is fixed to the end of the crankshaft 28 and rotates with the crankshaft 28. The movable pulley half 55b is disposed to the left of the fixed pulley half 55a in the illustrated configuration. A slide collar 59 can be mounted to the crankshaft 28 such that the slide collar 59 is slideable along a portion of the crankshaft 28. The movable pulley half 55b is mounted to the crankshaft 28 via the slide collar 59. In some configurations, the movable pulley half 55b and the slide collar 59 can be integrally formed. The movable pulley half 55b, therefore, rotates with the crankshaft 28 and can move freely along the axis of the crankshaft 28. A cam plate 58 is disposed to the left of the movable pulley half 55b. Between the cam plate 58 and the movable pulley half 55b is positioned a moveable cylindrical weight 61.

The secondary sheave 56 also comprises a fixed pulley half 56a and a movable pulley half 56b. The movable pulley half 56b is connected to the right end of the secondary sheave shaft 47 in the illustrated configuration. The movable pulley half 56b rotates with the secondary sheave shaft 47 and can move substantially freely along the axis of the secondary sheave shaft 47. A coil spring 67 is provided at the right end of the secondary sheave shaft 47. The movable pulley half 56b receives a leftward biasing force from the coil spring 67 in the illustrated configuration. The fixed pulley half 56a is disposed to the left of the movable pulley half 56b. A cylindrical slide collar 62 is connected to a portion of the fixed pulley half 56a. In the illustrated configuration, the cylindrical slide collar 62 is connected to the axial center of the fixed pulley half 56a. Splines connect the slide collar 62 to the secondary sheave shaft 47 although other suitable constructions that connect the slide collar and the secondary sheave shaft 47.

The speed reduction ratio of the continuously variable transmission 16 is determined by the relative force of the weight 61 pushing the driving-side movable pulley half 55b to the right and the force with which the coil spring 67 pushes the driven-side movable pulley half 56b to the left. In other words, when the rotational speed of the crankshaft 28 increases, the weight 61 moves radially outward (i.e., upward in FIG. 3) under the influence of centrifugal force to move the driving-side movable pulley half 55b to the right. Concurrently, the driven-side movable pulley half 56b moves to the right against the biasing force of the coil spring 67. As a result, the effective diameter of the V-belt 57 (i.e., the diameter along the pulleys at which the belt rides) in the driving pulley 55 increases and the effective diameter of the driven pulley 56 decreases, thus reducing the speed reduction ratio. On the other hand, when the rotational speed of the crankshaft 28 decreases, the centrifugal force of the weight 61 decreases, so that the weight 61 moves radially inward. Accordingly, the driving-side movable pulley half 55b moves to the left when the driven-side movable pulley half 56b moves to the left under the biasing force of the coil spring 67. As a result, the effective diameter of the V-belt 57 at the driving pulley 55 decreases and the effective diameter at the driven pulley 56 increases, thus increasing the speed reduction ratio.

A lock nut 66 can be screwed onto the end of the secondary sheave shaft 47. The secondary sheave 56 is fixed to the secondary sheave shaft 47 with the lock nut 66. Preferably, the lock nut 66 is secured to the right end 62a of the slide collar 62. The inside diameter of the slide collar 62 is stepped in the axial direction while the right end 47a of the secondary sheave shaft 47 decreases in steps. In other words, the secondary sheave shaft 47 decreases in diameter stepwise toward the end. Thus, the lock nut 66 can be positioned inside the right end 62a of the slide collar 62. Accordingly, the lock nut 66 can be located on the left of a spring bearing 65 of the coil spring 67. This allows the outward projection to be minimized without decreasing the length of the coil spring 67. Thus, the breadth of the engine unit 2 can be reduced with this construction.

With reference again to FIG. 2, the illustrated idle shaft 52 carries a reduction large gear 75, which engages with the primary reduction small gear 74 that is carried by the secondary sheave shaft 47. The idle shaft 52 further comprises a secondary reduction small gear 76. In one configuration, the idle shaft 52 and the secondary reduction small gear 76 are integrally formed. The drive shaft 48 carries a reduction large gear 77, which engages with the reduction small gear 76. In some configurations, the drive shaft 48 and the reduction large gear 77 are integrally formed.

In the illustrated configuration, the right end of the idle shaft 52 is supported by the left part of the second case 41 with a bearing 91. The left end of the illustrated idle shaft 52 is supported by the left part of the first case 40 through needle bearings or the like. The drive shaft 48 is mounted substantially parallel with the idle shaft 52. The right end of the illustrated drive shaft 48 is supported by the left part of the second case 41 with a bearing 92 while the left end of the illustrated drive shaft 48 is supported by the left part of the first case 40 with a bearing 93. The left end of the drive shaft 48 preferably carries a sprocket 49. The sprocket 49 can be integrally formed or separately formed and secured thereto. As shown in FIG. 1, the sprocket 49 preferably connects to a driven sprocket 51 of the rear wheel 7 with a chain 50. Other configurations, including belts, chains, flexible members, drive shafts and gear trains also can be used to transmit power to the rear wheel 7.

With reference now to FIG. 4, the secondary sheave shaft 47 and the drive shaft 48 preferably are defined by separate shafts. For saddle-type vehicles, such as motorcycles and scooters, for instance, which transmit driving force from the drive shaft 48 to the rear wheel 7 through a transmission member such as the chain 50, a transmission belt or a drive shaft, it is difficult to have a large spacing between the drive shaft 48 and the rear wheel 7. Thus, the placement of the drive shaft 48 relative to the vehicle body is restricted to some degree. On the other hand, the position of the secondary sheave shaft 47 and the idle shaft 52 of the speed-reduction mechanism 18 can be determined relatively freely. Thus, the illustrated engine unit 2 advantageously contains a separately formed secondary sheave shaft 47 and drive shaft 48 which allows increased flexibility in the positioning of the secondary sheave shaft 47 and the idle shaft 52. By forming the secondary sheave shaft 47 and the drive shaft 48 separately, the layout of the secondary sheave shaft 47 can adjusted without significant concern for the placement of the output shaft 48.

In a preferred configuration, the secondary sheave shaft 47 is disposed vertically higher than at least a portion of the drive shaft. The secondary sheave shaft 47 in the illustrated configuration is disposed above the drive shaft 48 and slightly ahead at least a portion of the drive shaft 48. Because the secondary sheave shaft 47 is disposed above the drive shaft 48 in the illustrated configuration, the lower portion of the engine unit 2 can be made compact, which ensures a relatively large vacant space under the engine unit 2. The illustrated idle shaft 52 is disposed forward of a generally transverse plane C that intersects the rotational axes of the second sheave shaft 47 and the drive shaft 48. Preferably, the axis of the idle shaft 52 is located between a generally horizontal plane that extends through the axis of the secondary sheave shaft 47 and another generally horizontal plane that extends through the axis of the drive shaft 48. Even more preferably, the idle shaft is positioned generally adjacent to the primary sheave 55.

Because the idle shaft 52 is disposed ahead of the imaginary plane C, which connects the axis of the drive shaft 48 and the axis of the secondary sheave shaft 47, the rear portion of the engine unit 2 also can be made more compactly, which ensures a relatively large void behind the engine unit 2. Moreover, the reduction gear 75 (reduction large gear) of the idle shaft 52 can partially overlap the primary sheave 55 when viewed from the side. Such a construction also allows the rear part of the engine unit 2 to be reduced in size.

The secondary sheave shaft 47 is disposed vertically higher than the primary sheave shaft 55d and, as such, the secondary sheave 56 is disposed generally vertically higher than the primary sheave 55. Preferably, the secondary sheave 56 also is disposed above the primary sheave 55. Thus, a void is defined generally forward and vertically above the secondary sheave 56. Thus, in the illustrated engine unit 2, an air-intake component 154, which can comprise the intake pipe 23a and the carburetor 23, is able to be positioned in the void, which reduces the size of the illustrated engine unit 2.

The drive shaft 48 is located inside the profile or trace (i.e., the visible outline) of the transmission case 45 (i.e., the portion that encloses the continuously variable transmission) as viewed from the side of the vehicle body. In other words, the drive shaft 48 is arranged within the profile of the transmission case 45. Preferably, at least a majority of the drive shaft 48 (e.g., more than half of the drive shaft 48) is located inside of the profile of the transmission case 45. In other words, when viewed from the side of the vehicle, the profile of the transmission case 45 may intersect the drive shaft 48 such that a majority of the drive shaft 48 is positioned within the profile of the transmission case. In the illustrated engine unit 2, the reduction gear 77 of the drive shaft 48 also is disposed substantially inside the outline of the transmission case 45, as viewed from the side. Because the drive shaft 48 is disposed inside the outline of the transmission case 45 as viewed from the side, the drive shaft 48 and the speed-reduction mechanism 18 can be efficiently arranged in the illustrated engine unit 2 and the overall size of the engine unit can be reduced.

Because the illustrated secondary sheave 56 is disposed vertically higher than the primary sheave 55 and the drive shaft 48, there is a spatial allowance around the drive shaft 48. Therefore, the layout around the drive shaft 48 can be determined relatively freely. Accordingly, the rear arm 8 can be lengthened, which improves steering stability and other vehicle ride characteristics. The illustrated pivot shaft 100 also can be located in a position lower than the axial center of the secondary sheave shaft 47.

The drive shaft 48 and the pivot shaft 100 can be arranged close to each other in the illustrated configuration. While any suitable spacing can be used, it is preferable have the spacing be less than the diameter of the secondary sheave 56 and, more preferably, less than the radius of the secondary sheave 56. With such a limited spacing, the slack of the chain 50 wound around the drive shaft 48 can be reduced when the rear arm 8 moves around the pivot shaft 100. Consequently, the transmission efficiency of the driving force to the rear wheel 7 can be improved and noise generation created by chain slack can be reduced. Even with a drive shaft as a transmission member in place of the chain 50, for instance, substantially the same advantages can be offered because the interval between the drive shaft 48 and the pivot shaft 100 is short. In other words, the transmission efficiency can be increased by the illustrated configuration while the rear arm 8 moves around the pivot shaft 100.

With reference now to FIG. 4, a starting kick shaft 150 (also referred to as a kick starter shaft) extends laterally below the drive shaft 48. The starting kick shaft 150 preferably is disposed inside the outline of the crank case 22 and outside the outline of the transmission case 45, when viewed from the side. Accordingly, the starting kick shaft 150 advantageously is disposed in the position that does not overlap with the transmission case 45 as viewed from the side.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle engine unit comprising an engine body, the engine body comprising a transversely-extending crankshaft, a transmission comprising a primary sheave, a secondary sheave and a flexible member connecting the primary sheave and the secondary sheave, the primary sheave connected to the crankshaft such that the crankshaft and the primary sheave rotate together, the secondary sheave connected to a transversely-extending secondary sheave shaft such that the secondary sheave and the secondary sheave shaft rotate together, a transmission case generally enclosing the primary sheave, the secondary sheave, and the flexible member, a transversely-extending idle shaft connected to the secondary sheave shaft such that rotation of the secondary sheave shaft causes rotation of the idle shaft, the idle shaft forming a portion of a speed-reduction mechanism, a transversely-extending drive shaft connected to the speed-reduction mechanism, the idle shaft reducing a rotational speed of the drive shaft when the vehicle runs forward, the secondary sheave shaft being positioned vertically higher than at least a portion of the drive shaft, an imaginary plane extending through a rotational axis of the secondary sheave shaft and the drive shaft, the idle shaft being disposed between the primary sheave and the imaginary plane, and the drive shaft being positioned inside an outer profile of the transmission case when viewed from a lateral side of the engine unit the speed-reduction mechanism further comprising a first reduction gear that is carried by the idle shaft and at least a portion of the first reduction gear overlapping with the primary sheave when viewed from the lateral side of the engine unit.

2. The vehicle engine of claim 1 in combination with a vehicle comprising a seat, the seat having a sufficiently narrow width to allow an operator to straddle the seat while operating the vehicle.

3. The vehicle engine of claim 1 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine as viewed from the lateral side of the engine unit, the vehicle also comprising a seat, the seat having a sufficiently narrow width to allow an operator to straddle the seat while operating the vehicle.

4. The vehicle engine of claim 1 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and vertically lower than the rotational axis of the secondary sheave shaft as viewed from the lateral side of the engine unit, the vehicle also comprising a seat, the seat having a sufficiently narrow width to allow an operator to straddle the seat while operating the vehicle.

5. A vehicle engine unit comprising an engine body, the engine body comprising a transversely-extending crankshaft, a transmission comprising a primary sheave, a secondary sheave and a flexible member connecting the primary sheave and the secondary sheave, the primary sheave connected to the crankshaft such that the crankshaft and the primary sheave rotate together, the secondary sheave connected to a transversely-extending secondary sheave shaft such that the secondary sheave and the secondary sheave shaft rotate together, a transmission case generally enclosing the primary sheave, the secondary sheave, and the flexible member, a transversely-extending idle shaft connected to the secondary sheave shaft such that rotation of the secondary sheave shaft causes rotation of the idle shaft, the idle shaft forming a portion of a speed-reduction mechanism, a transversely-extending drive shaft connected to the speed-reduction mechanism, the idle shaft reducing a rotational speed of the drive shaft when the vehicle runs forward, the secondary sheave shaft being positioned vertically higher than at least a portion of the drive shaft, an imaginary plane extending through a rotational axis of the secondary sheave shaft and the drive shaft, the idle shaft being disposed between the primary sheave and the imaginary plane, and the drive shaft being positioned inside an outer profile of the transmission case when viewed from a lateral side of the engine unit, the vehicle engine in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and vertically lower than the rotational axis of the secondary sheave shaft as viewed from the lateral side of the engine unit, the vehicle also comprising a seat, the seat having a sufficiently narrow width to allow an operator to straddle the seat while operating the vehicle.

6. A vehicle engine unit comprising an engine body, the engine body comprising a transversely-extending crankshaft, a transmission comprising a primary sheave, a secondary sheave and a flexible member connecting the primary sheave and the secondary sheave, the primary sheave connected to the crankshaft such that the crankshaft and the primary sheave rotate together, the sec6ndary sheave connected to a transversely extending secondary sheave shaft such that the secondary sheave and the secondary sheave shaft rotate together, a transmission case generally enclosing the primary sheave, the secondary sheave, and the flexible member, a transversely-extending idle shaft connected to the secondary sheave shaft such that rotation of the secondary sheave shaft causes rotation of the idle shaft, the idle shaft forming a portion of a speed-reduction mechanism, a transversely-extending drive shaft connected to the speed-reduction mechanism, the speed-reduction mechanism further comprising a first reduction gear that is carried by the idle shaft, at least a portion of the first reduction gear overlapping with the primary sheave when viewed from the lateral side of the engine unit, the secondary sheave shaft being positioned vertically higher than at least a portion of the drive shaft, an imaginary plane extending through a rotational axis of the secondary sheave shaft and the drive shaft, the idle shaft being disposed between the primary sheave and the imaginary plane, and the drive shaft being positioned inside an outerprofile of the transmission case when viewed from a lateral side of the engine unit.

7. The vehicle engine of claim 6 in combination with a vehicle comprising a seat, the seat having a sufficiently narrow width to allow an operator to straddle the seat while operating the vehicle.

8. The vehicle engine of claim 6 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine as viewed from the lateral side of the engine unit, the vehicle also comprising a seat, the seat having a sufficiently narrow width to allow an operator to straddle the seat while operating the vehicle.

9. The vehicle engine of claim 6 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and vertically lower than the rotational axis of the secondary sheave shaft as viewed from the lateral side of the engine unit, the vehicle also comprising a seat, the seat having a sufficiently narrow width to allow an operator to straddle the seat while operating the vehicle.

10. The vehicle engine of claim 6 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and outside of a secondary sheave diameter of the drive unit as viewed from the lateral side of the engine unit, the vehicle also comprising a seat, the seat having a sufficiently narrow width to allow an operator to straddle the seat while operating the vehicle.

11. The vehicle engine according to claim 6, wherein the speed-reduction mechanism further comprises a second reduction gear carried by the drive shaft and the second reduction gear being disposed inside the outer profile of the transmission case when viewed from the lateral side of the engine unit.

12. The vehicle engine of claim 11 in combination with a vehicle comprising a seat, the seat having a sufficiently narrow width to allow an operator to straddle the seat while operating the vehicle.

13. The vehicle engine of claim 11 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine as viewed from the lateral side of the engine unit, the vehicle also comprising a seat, the seat having a sufficiently narrow width to allow an operator to straddle the seat while operating the vehicle.

14. The vehicle engine of claim 11 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and vertically lower than the rotational axis of the secondary sheave shaft as viewed from the lateral side of the engine unit, the vehicle also comprising a seat, the seat having a sufficiently narrow width to allow an operator to straddle the seat while operating the vehicle.

15. The vehicle engine of claim 11 in combination with a vehicle that comprises a vehicle body supporting the vehicle engine such that the drive shaft is located rearward of the crankshaft, a rear arm movably being supported by the vehicle body and supporting a rear wheel, and a transmission member transmitting a driving force from the drive shaft to the rear wheel, the pivot axis of the rear arm relative to the vehicle body being located behind the vehicle engine and outside of a secondary sheave diameter of the drive unit as viewed from the lateral side of the engine unit, the vehicle also comprising a seat, the seat having a sufficiently narrow width to allow an operator to straddle the seat while operating the vehicle.

16. The vehicle engine of claim 6, wherein the secondary sheave shaft is positioned above at least a portion of the drive shaft.

17. The vehicle engine of claim 6, wherein a drive sprocket is carried by the drive shaft.

* * * * *

UNITED STATES PATENT AND TRADEMARK OFFICE
CERTIFICATE OF CORRECTION

PATENT NO. : 7,631,718 B2 Page 1 of 1
APPLICATION NO. : 11/333766
DATED : December 15, 2009
INVENTOR(S) : Masuda et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 418 days.

Title page, item 63, Related US Application Data, Line 1, Change "PCT/JP2004/00882," to --PCT/JP2004/08882,--.

Column 3, Line 3, change "1a." to --1 a.--.

Column 11, Line 52, In Claim 6, change "sec6ndary" to --secondary--.

Signed and Sealed this

Seventeenth Day of August, 2010

David J. Kappos
*Director of the United States Patent and Trademark Office*